US006597366B1

(12) United States Patent
Bennett et al.

(10) Patent No.: US 6,597,366 B1
(45) Date of Patent: Jul. 22, 2003

(54) TRANSPARENT GENERAL PURPOSE OBJECT ISOLATION FOR MULTI-TIER DISTRIBUTED OBJECT ENVIRONMENTS

(75) Inventors: Brian T. Bennett, Mahopac, NY (US); Avraham Leff, New Hempstead, NY (US); Thomas A. Mikalsen, Cold Spring, NY (US); James T. Rayfield, Ridgefield, CT (US); Isabelle M. Rouvellou, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/483,511

(22) Filed: Jan. 14, 2000

(51) Int. Cl.$^7$ ................................................ G06F 17/60
(52) U.S. Cl. ...................................................... 345/619
(58) Field of Search .................................. 345/619, 749; 705/1, 4, 38; 707/100, 103 R, 103 Y, 103, 103 Z, 104.1; 717/118, 148

(56) References Cited

PUBLICATIONS

Pearson Technology Group, Advanced Java 2 Development for Enterprise Applications 2/e, Clifford J. Berg, Published Dec. 1999, Prentice Hall, chapter 8, p. 602–658. [Retrived on Aug. 8, 2000, from http://www.pearsonptg.com/samplechapter/0130848751.pdf].*
Dittrich et al., "Version Support for Engineering Database Systems", IEEE Transactions on Software Engineering, vol. 14, No. 4, Apr. 1988, pp. 429–436.
Snodgrass et al., "Temporal Databases", Computer, vol. 10, No. 9, Sep. 1986, pp. 35–42.
Heller et al., "Parallelism and Recovery in Database Systems", ACM Transactions on Database Systems, vol. 5, No. 2, Jun. 1980, pp. 139–156.
Bernstein et al., "Multiversion Concurrency Control" (Chapter 5) from "Concurrency Control and Recovery in Database Systems", Addison–Wesley 1987, (ISBN 0–201–10715–5), pp. 143–163.
Ceri et al., "Distributed Databases: An Overview", (Chapter 1) from "Distributed Databases, Principles and Systems", McGraw–Hill 1984 (ISBN 0–07–010829–3),pp. 1–12.

* cited by examiner

*Primary Examiner*—Matthew C. Bella
*Assistant Examiner*—G. F. Cunningham
(74) *Attorney, Agent, or Firm*—F. Chau & Associates, LLP

(57) ABSTRACT

A method for manipulating objects in isolation, in accordance with the invention, includes providing a shared object, B, from an object provider for use on a distributed object system. A new class of objects are provided which include a facade object, Bf, for B and a versionable representation object, Bv, for B wherein Bf supports a same interface as B. B is permitted to be manipulated in a given context isolated from other contexts for the object B wherein the object provider and an object user are unaware of the production and manipulation of the new class of objects. Method invocations on Bf in the given context are delegated to Bv to associate an instance of Bv with the given context such that one or more versions of object B are persistently maintained in the distributed object system.

35 Claims, 8 Drawing Sheets

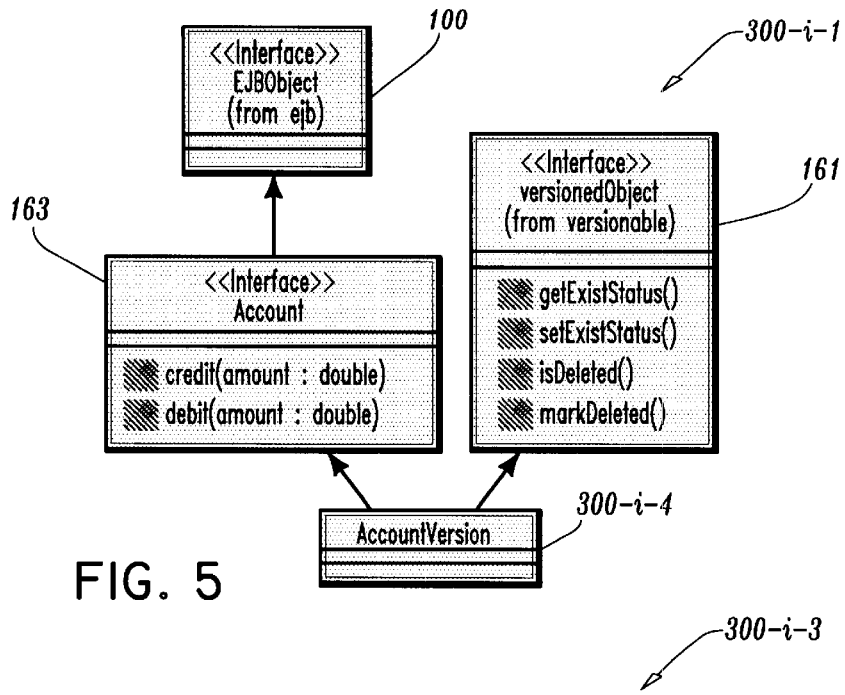
FIG. 5
FIG. 6
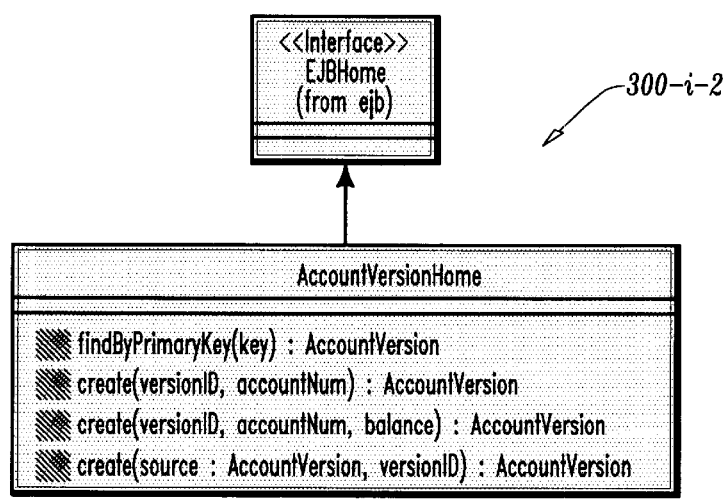
FIG. 7

TRANSPARENT GENERAL PURPOSE OBJECT ISOLATION FOR MULTI-TIER DISTRIBUTED OBJECT ENVIRONMENTS

BACKGROUND OF THE INVENTION

1. Field of the Invention

The present invention relates to distributed object systems, and more particularly to a method for isolating shared objects for transparent manipulation of the shared objects for a plurality of applications.

2. Description of the Related Art

The ENTERPRISE JAVABEANS™ architecture is a component architecture for the development of and deployment of JAVA™ (see The JAVA Language Specification, J. Gosling, B. Joy and G. Steele, Addison-Wesley Longman, Reading, Mass., 1996) applications in a multi-tier distributed object environment. (ENTERPRISE JAVABEANS and JAVA are trademarks of Sun Microsystems, Inc.). In a multi-tier application architecture most of an applications' logic is moved to one or more servers. The server components (those that run on the server) which conform to this architecture are referred to as enterprise beans and are portable across all ENTERPRISE JAVABEANS' server systems i.e., component execution systems that support ENTERPRISE JAVABEANS (EJBs). ENTERPRISE JAVABEANS which have a persistent state are referred to as entity beans. The persistent state of an entity bean is maintained in a relational or object database.

Support for transactions is an essential part of ENTERPRISE JAVABEANS. Transactions are used not only for making units of work atomic but also for isolating concurrently executing units of work from each other. The actual implementation of transactions is the responsibility of the provider of the ENTERPRISE JAVABEANS server. Typically, the implementation utilizes the transaction capabilities of the relational or object database used to maintain the persistent state of the beans. These database systems normally maintain just one version of each bean instance. Isolation is achieved by controlling the read and write access to that single version. This is appropriate for some applications, but for others, it is desirable to have the system maintain versions.

Having a relational or object database support multiple versions of an object has been described many times and for many different purposes in the literature. For example:

a) for implementing temporal databases. In these databases each version has the values of the attributes of the object that pertained for a particular time period and were considered valid for some other time period. (see "Temporal Databases", R. Snodgrass and I. Ahn, Computer, Vol.10, No.9, September 1986).

b) for recovery. Versions are used to represent consistent database states to which a system can return to after a crash. (see "Parallelism and Recovery in Database Systems", R. Bayer, H. Heller and A. Reiser, ACM Transactions on Database Systems, Vol.5, No.2, June 1980).

c) for support of documents or engineering designs. The versions may represent different alternatives for a design or document (see "Version Support for Engineering DataBase Systems", K. Dittrich and R. Lorie, IEEE Transactions on Software Engineering, Vol.14, No. 2, April 1988).

It is important to note that these examples expose the versions to the client application, and versions have been used internally to a relational or object database system, for example:

a) for enhancing performance in distributed systems. Typically several copies of the same object exist at different sites (see "Distributed Databases, Principles and Systems", S. Ceri and G. Pelagatti, McGraw-Hill 1984, (ISBN 0-07-010829-3)).

b) for concurrency control. In multi-version concurrency control, temporary non-persistent versions are maintained (see "Concurrency Control and Recovery in Database Systems", P. Bernstein, V. Hadzilacos and N. Goodman, Addison-Wesley 1987, (ISBN 0-201-10715-5)). Therefore, a need exists for a system and method for transparent, general purpose object isolation such that an object provider and/or an object user are unaware of the manipulations of objects as will be described in detail below.

SUMMARY OF THE INVENTION

A method for manipulating objects in isolation, in accordance with the invention, includes providing a shared object, B, from an object provider for use on a distributed object system, from which a new class of objects are provided which include a facade object, Bf, for B and a versionable representation object, Bv, for B wherein Bf supports a same interface as B. B is permitted to be manipulated, through the new class of objects, in a given context isolated from other contexts for the object B wherein the object provider and an object user are unaware of the production and manipulation of the new class of objects. Method invocations on Bf in the given context are delegated to Bv to associate an instance of Bv with the given context such that one or more versions of object B are persistently maintained in the distributed object system. Another method for manipulating objects in isolation includes the steps of transforming an object class, B, into a new object class, B', which subsumes B, such that instances of B' are substituted for instances of B, where B' provides behavior permitting a same instance of B' to be used concurrently by multiple object users, such that each object user can manipulate a state of the object instance isolated from effects of other object users and an object provider and an object user are unaware of the transformation to the new object class. The step of transforming further includes the steps of providing an object class, B, from an object provider for use on a distributed object system. For the new class B', the following steps are included: producing a version class, Bv, where Bv supports the behavior and attributes of B, and producing a facade class, Bf, where Bf supports a same interface as B, wherein instances of Bf are substituted for instances of B such that invocations on an instance of Bf are delegated to an instance of Bv which is associated with an object user.

In alternate methods, the step of producing may include the step of automatically producing the facade object and the version object upon presentation of the object, B. The given context is preferably client specific. The given context may include a unique client identifier to identify a version of Bv. The step of delegating method invocations on Bf in the given context to Bv may include the step of identifying versions of the object B by comparing attributes of versions of the object Bv. The step of delegating method invocations on Bf in the given context to Bv, may further include the step of maintaining version instances at the facade Bf and transparently dispatching client requests on the object Bv to the version associated with the client. The step of producing a facade object, Bf, for B and a versionable representation object, Bv, may include the step of generating classes for the facade object and the versionable representation object, the classes including a remote interface, a home interface, a primary key and an implementation.

The methods may further include the step of producing version state-classes for representing attributes of the object B and copying one version of the attributes to another version of the attributes in accordance with version updates. The method as recited in claim 25, wherein the step of manipulating Bf in a given context includes the step of mapping client requests to versions of the object B in the versionable representation Bv. The step of delegating method invocations on Bf in the given context to Bv may include the step of identifying versions of the object B by key attributes of versions of objects. The object B may include an ENTERPRISE JAVABEAN. The objects Bf and Bv may also include ENTERPRISE JAVABEANs. The method may include the step of storing a plurality of versions of B in Bv on a memory storage device. The step of reconciling object manipulations in Bv with the distributed object system may also be included.

It should be noted that objects B and Bf and Bv need not be the same type for example, they need not be EJBs. The methods and method steps as described herein above may be implemented with or on a program storage device.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein:

FIG. 5 is a block diagram showing a remote interface for a version object in accordance with the present invention;

FIG. 6 is a block diagram showing a version primary key class object in accordance with the present invention;

FIG. 7 is a block diagram showing a version home interface object in accordance with the present invention;

DETAILED DESCRIPTION OF PREFERRED EMBODIMENTS

Figure 1:
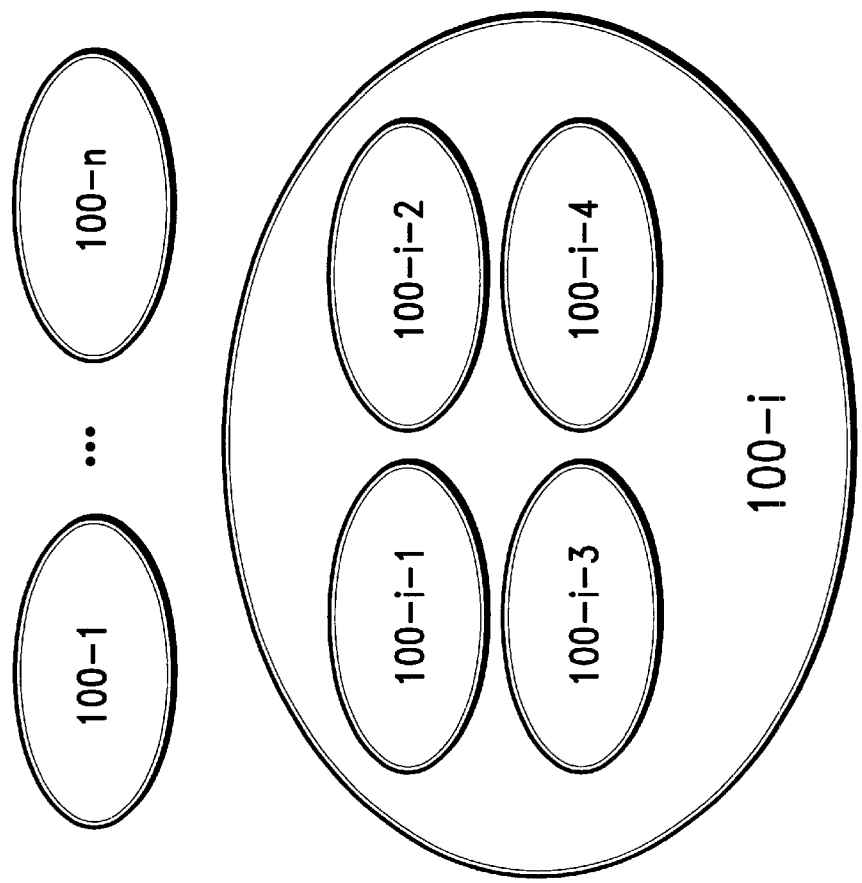
FIG. 1 is a schematic diagram of input objects for the present invention.

The present invention relates to distributed object systems, and more particularly to a method for isolating shared objects for transparent manipulation until a consistent state can be achieved for the objects. The objects employed by the present invention are preferably Enterprise Java Beans (EJBs), although other types of objects and other types of frameworks are also contemplated. An EJB is an object that is container managed (or bean managed), and accessed using specific interfaces that are provided by the container (or beans). EJBs may be transient (session beans) or persistent (entity beans).

In distributed object systems, applications often require concurrent access to shared objects. There is also a competing need that an application manipulate these shared objects in isolation, making changes visible to other applications only after a consistent state has been reached. In this way, if an application fails, the work is easily aborted without detrimentally altering the shared objects.

The present invention automatically transforms an EJB into an object that can be transparently used in isolation. Neither the original EJB nor application code that manipulates the EJB need be aware of this transformation. The general purpose approach of the present invention is well suited for many applications, including nested transactions, what-if scenarios, disconnected computing object replication and many other applications.

Versions of objects may be needed in multi-tier distributed object frameworks, for example, in frameworks designed to handle business processes, such as mortgage application processing or insurance policy underwriting which include other smaller processes such as entering the information about the applicant, calculating the monthly payments etc. which may themselves have sub-processes. Overall, these processes form a hierarchy. These processes can run for several days to a month or even longer. Intermediate results of these processes must be persistent. The client applications may deal with two types of objects: the unit of work (or UOW) object which represents a nested long running transaction (provided by the framework), and temporal business objects. On the server, the framework is maintained for each temporal business object version objects, both to support the temporal data and to maintain versions for each concurrent client application. The framework may be provided temporal methods which were programmed to use the versions associated with the current unit-of work. In general to satisfy the requirements of long running business processes which consist of a hierarchy of smaller business processes and whose intermediate results must be persistent, object versions can be utilized. However, it is important that the versions be transparent to the client application.

The present invention provides a flexible method and will illustratively be described in terms of EJBs. Any specification conforming EJB (or other object) can be transformed into an object ready for use in isolation. Any code written to manipulate the original EJB is still valid. The validity and propagation of concurrent object changes can be managed by the application, rather than strict locking rules employed in prior art systems. Further, work performed on isolated objects is persistent. Prior art object versioning is typically ad-hoc, and requires changes to both the business object's implementation and the interface. In these prior art systems, work performed on isolated objects is not persistent. Persistent, in terms of this disclosure, refers to storage on a durable medium, such as a disk, etc. which can survive, for example, a system crash.

In one illustrative example, the present invention is applied to e-commerce applications, over the Internet, for example. E-commerce settings include distributed object technology, most notably JAVA and COBRA, to enable cross-platform interoperability of new Internet or other network systems and/or databases. Many e-commerce business processes are complex and potentially long-running processes, as they execute multiple data queries and updates, and also rely on user input. In addition, the processes often are transactional process, i.e., it is desired to assure (different levels of) the transactional properties of atomicity, consistency, isolation and durability (ACID) to the long-running process.

It should be understood that the elements shown in FIGS. 1–11 may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, input for the present invention may include of one or more objects 100, for example, business objects (BO) 100-1 through 100-n. Business objects may include, for example, objects used in conducting business electronically, such as registration of a new client on in interactive web page or for a private network, etc. In this illustrative embodiment, BOs are container managed entity ENTERPRISE JAVABEANS (EJB). Each BO EJB, 100-i, may itself be composed of four classes: 100-i-1 (remote interface), 100-i-2 (home interface) 100-i-3 (primary key), 100-i-4 (implementation). It is to be appreciated that the present invention is applicable to any component model (e.g., COM, CORBA Components or other systems where implementations are separated from interfaces, i.e., for distributed object systems) using any computer programming language. For simplicity, the present invention will be described in terms of BOs and generated EJBs.

Figure 2:
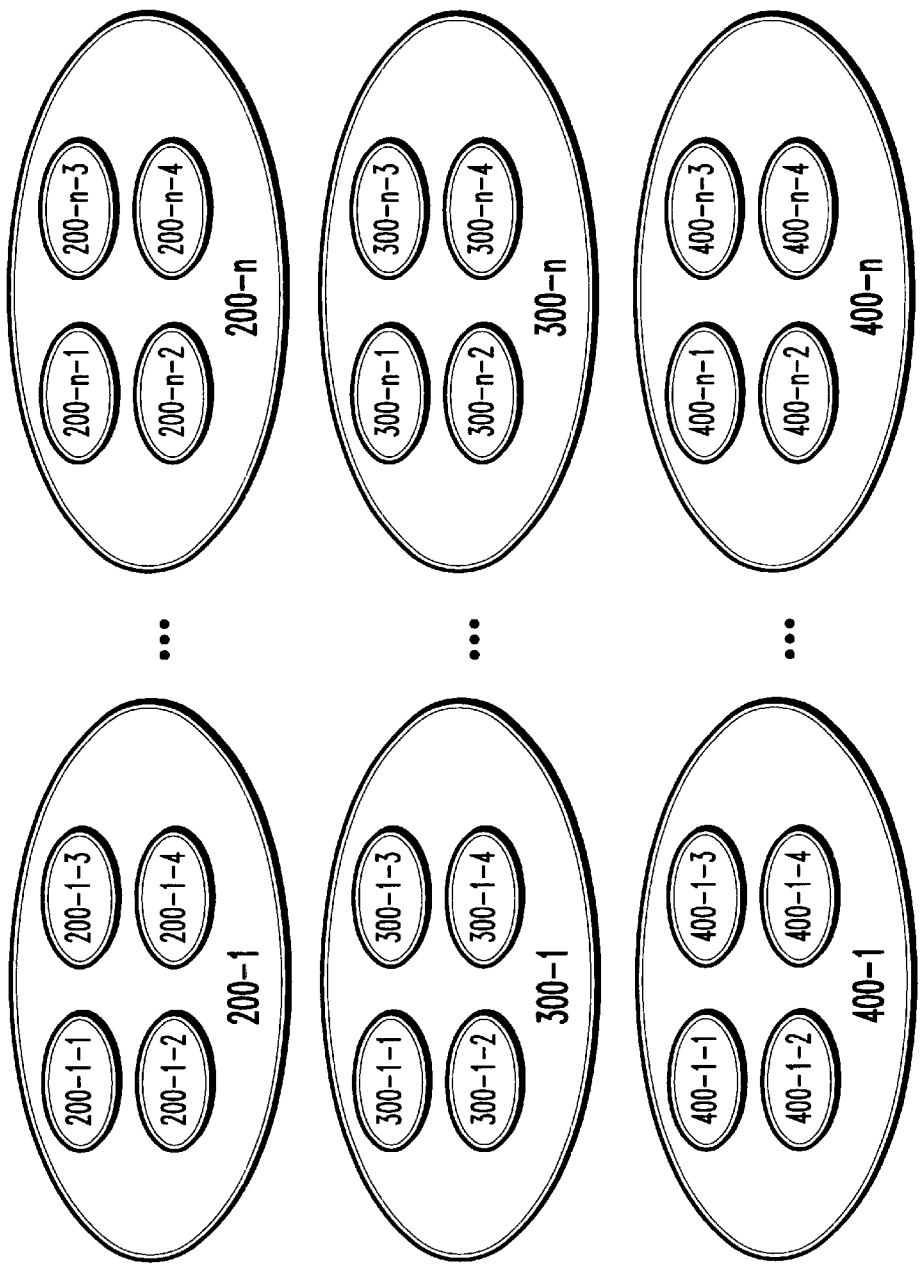
FIG. 2 is a schematic diagram for generated objects including facade objects, version objects, and version state objects in accordance with the present invention.

For the objects shown in FIG. 1, the present invention transparently provides isolation for the inputs 100-1 through 100-n by using the following constructs as illustrated in FIG. 2. FIG. 2 shows facade entity EJBs 200-1 to 200-n (corresponding to BOs 100-1 to 100-n), version entity EJBs 300-1 to 300-n (corresponding to BOs 100-1 to 100-n) and version state classes 400-1 to 400-n (corresponding to BOs 100-1 to 100-n). Facade entity EJBs 200-1 through 200-n, version Entity EJBs 300-1 through 300-n, and version-state classes 400-1 through 400-n are automatically generated for BOs input to a system, for example a distributed system having servers and client interface terminals which may include personal computers. Automatic generation is provided by a deployment tool (described in FIG. 10 below), in accordance with the invention, which outputs these objects in addition to or instead of normally outputted objects.

Each facade EJB, 200-i, (i is employed as an index to generally refer to objects) is itself composed of four classes: 200-i-1 (remote interface), 200-i-2 (home interface) 200-i-3 (primary key), 200-i-4 (implementation); each version EJB, 300-i, is itself composed of four classes: 300-i-1 (remote interface), 300-i-2 (home interface) 300-i-3 (primary key), 300-i-4 (implementation). The version EJBs 300 introduce a mechanism for distinguishing multiple versions of the same business object instance. This mechanism may be referred to as the "isolation id". Each version instance is associated with a specific client (or a particular usage or application, for example results of a previous calculation or what-if scenario); each client is preferably assigned a unique isolation id so that a version may be assigned to the client or object user. An object user may include a human user or a software or hardware user including other objects or beans.

The facade entities (facade objects 200) maintain a collection of version instances (e.g., a version object), and transparently dispatch client requests on a business object to the version associated with that client.

To achieve transparent isolation, (a) existing clients of BO interface 100-i-1 should not require modification to access the associated version 300-i-4 and state (400-i-4), and (b) the business object, 100-i, should not require modification to be versioned. The present invention provides a means for achieving these isolation goals in the following manner: (a) the facade interface, 200-i-1, subsumes the BO interface, 100-i-1, and substitutes for the BO interface used by the client; (b) the version implementation, 300-i-4, subsumes the BO implementation, 100-i-4.

In the absence of the present invention, a BO instance refers to the existence of an entity EJB with identity 100-i-3. For the present invention, the term BO instance refers to: (a) a facade entity EJB with identity 200-i-3 identical to BO identity 100-i-3; (b) a collection of version instances, each with identity 300-i-3 defined to be the duple {e.g., 100-i-3, isolation-id}. Each client is assigned a unique isolation id which is the second component of the version identity duple. (Note that the assignment of isolation ids is preferably transparent to the client, and is implicitly propagated as part of a method invocation. See CORBA Portable Request Interceptor as an example of such a technique.)

Figure 3:
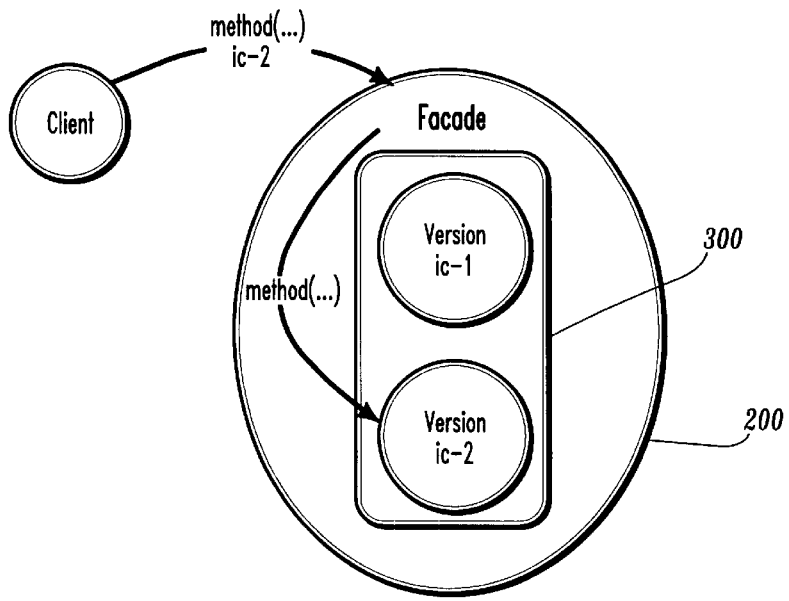
FIG. 3 is a schematic diagram showing a facade object delegating a method to a version of the object in an isolation context in accordance with the present invention.

Referring to FIG. 3, a runtime invocation path is shown in accordance with the present invention. At runtime, a client method invocation of BO interface 100-i-1, with identity 100-i-3, is:

1) received by facade 200, with identity 100-i-3;
2) the facade extracts the clients isolation id (for example, isolation context-2 or ic-2) from the method invocation; and
3) the facade delegates the method invocation to version 300-i-1 with identity {100-i-3, isolation id (e.g., ic-2)}.

Figure 4:
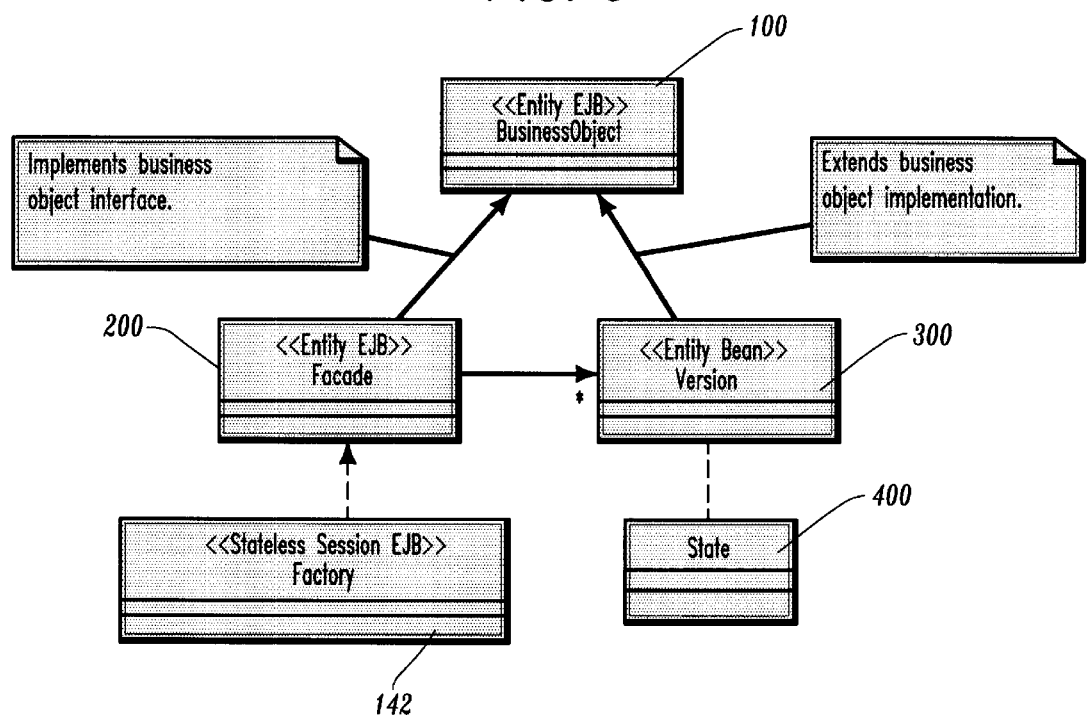
FIG. 4 is a block diagram showing a facade, version and state objects relationships with an original object (or business object) in accordance with the present invention.

Referring to FIG. 4, automation of the isolation technique in EJB is illustratively shown in accordance with the present invention. By providing a deployment tool (FIG. 10), which subsumes the EJB deployment tool, the present invention extends the notion of transparency to include the deployment process. In other words, the deployment tool advantageously works with the system to automatically create facade objects, version objects, etc. in accordance with the invention. An object provider or bean provider in JAVA is unaware of the generation of usage of facades, versions etc. JAVA introspection/reflection using the deployment tool of the invention may be used to automatically generate the facade 200, version 300, and version-state 400 classes described above. For a given business object 100 (e.g., EJB), a set of EJB and helper classes are generated. These classes adapt the original EJB 100 to the system such that the EJB can be used in isolation by applications. Therefore, the object user and the object provider are unaware of the generation and usage of facade 200, version 300, and version-state 400 classes.

A facade entity 200 is manufactured by a stateless session EJB factory 142 which automatically provides an entity EJB for facade entity 200 at runtime. Facade entity 200 is employed to generate a version 300 of EJB which in turn includes version-state 400. These generated artifacts include:

a) Version Entity EJB 300—The Version EJB is a versionable representation of the original business object. As such, Version EJBs introduce additional attributes which distinguish one version from another. Version objects also provide logic for copying one version to another.

b) Facade Entity EJB 200—The Facade EJB is responsible for mapping a client's view of a business object to specific versions of that business object. The Facade also provides services not visible to the client, but rather used internally by the system. For example, the logic used to create a new version from an existing version is provided by the Facade.

c) VersionState class 150—The VersionState class is used to copy the state of a business object. State classes are used to initialize and copy the state of one version to another. The relationships between these classes are shown in FIG. 4. Facade entity 200 is responsible for implementing an interface with business object 100 while the version entity extends business object implementation as will be explained below.

The Version entity bean is a versionable representation of the original business object. At runtime, a unique version instance is created for each business object instance participating in a given isolation context (ic). Any requests on that business object are routed to the version instance associated with that isolation context. Thus, Version EJB instances are never directly accessed by clients; clients manipulate Version beans indirectly through Facade objects (see herein below).

Version EJBs use inheritance to extend the original business object EJB. The remote interface and implementatinon classes (300-i-1 and 300-i-4, respectively) extend the remote interface and implementation class of the original business object EJB (100-i-1 and 100-i-4, respectively). Therefore, a Version EJB is the original business object EJB, with some additional attributes and behavior. The business logic of the original EJB is not overridden.

Referring to FIG. 5, an illustrative remote interface 300-i-1 for version EJB's is shown in accordance with the present invention. The Version EJB's remote interface 300-i-1 extends the remote interface of the original business object 100-i-1, and a versionedObject interface 161. The business object's remote interface 300-i-1 specifies methods 163, for example business methods, such as credit and debit methods, supported by the object 100. These methods are invoked by version delegation code within the Facade 200 (See FIG. 2). In addition to the business methods, the versionedObject interface 161 introduces methods to get and set the existStatus of a version (described below), e.g., stored in Account version which includes implementation class object 300-i-4). These methods are invoked by the Isolation runtime, and are not visible to clients.

Referring to FIG. 6, a version primary key class 300-i-3 is illustratively shown. To distinguish one version of a business object instance from another, the Version uses a variant of the business object's primary key (100-i-3, see FIG. 1). The augmented key includes all attributes from the original primary key, plus additional attributes, for example: versionID. As described above, the versionID attribute indicates the isolation context of this version.

The version primary key preferably implements the java.lang.Object equals( . . . ) and hashcode( ) methods. The equals( . . . ) method compares two primary key instances using a field-wise comparison. This is needed by EJB servers, to distinguish between EJB instances. Primitive fields are compared using the "==" operator. Object fields are compared using the Object.equals( ) method. Therefore, the fields that compose the original primary key should be either primitives, types or classes that correctly implement the equals( ) method. The hashCode( ) method returns an appropriate hash value for a given instance. This hash code is formed by aggregating the hash codes of the composing fields. For numeric primitives, the hash code is obtained by converting the fields value to an integer. For boolean types, for example, the hash code is '1' if the value is true, and '0' if the value is false.

Referring to FIG. 7, a Version entity bean's Home interface 300-i-2 is used to create, remove, and locate Version instances. These operations are invoked by the Facade 200 (see FIG. 2). For each create method on the business object home 100-i-2 (FIG. 1), there is an augmented create method on the Version home 300-i-2. The augmented create methods are of the form Version create(String versionID, boolean updateableCopy, . . . ) where " . . . " represents the original signature. These create methods are used by the runtime during the explicit creation of business objects; e.g., when a client is instantiating a new business object. An additional create method of the form create(Version parent, String versionID, boolean updateableCopy) is included in the Version's home interface. This create method is used by the runtime during the implicit creation of version objects; e.g. the first access to a business object instance within a given unit-of-work. A single finder method, findByPrimaryKey, is supported by the Version home. Finder methods specified in the business object's home are implemented by the Facade EJB 200 (described below).

The Version bean implementation class 300-i-4 extends the implementation class of the original business object, and implements the versionedObject interface (see FIG. 5). Attributes for the version's identity and existence status are also added. The state data for a Version entity includes all state data from the original business object, and in one embodiment, additional attributes, for example: versionID and existStatus. As described above, the versionID attribute is used to distinguish between different versions of the same business object instance. The existStatus attribute is used to indicate that a version has been deleted, even though an instance representing the version remains.

Figure 8:
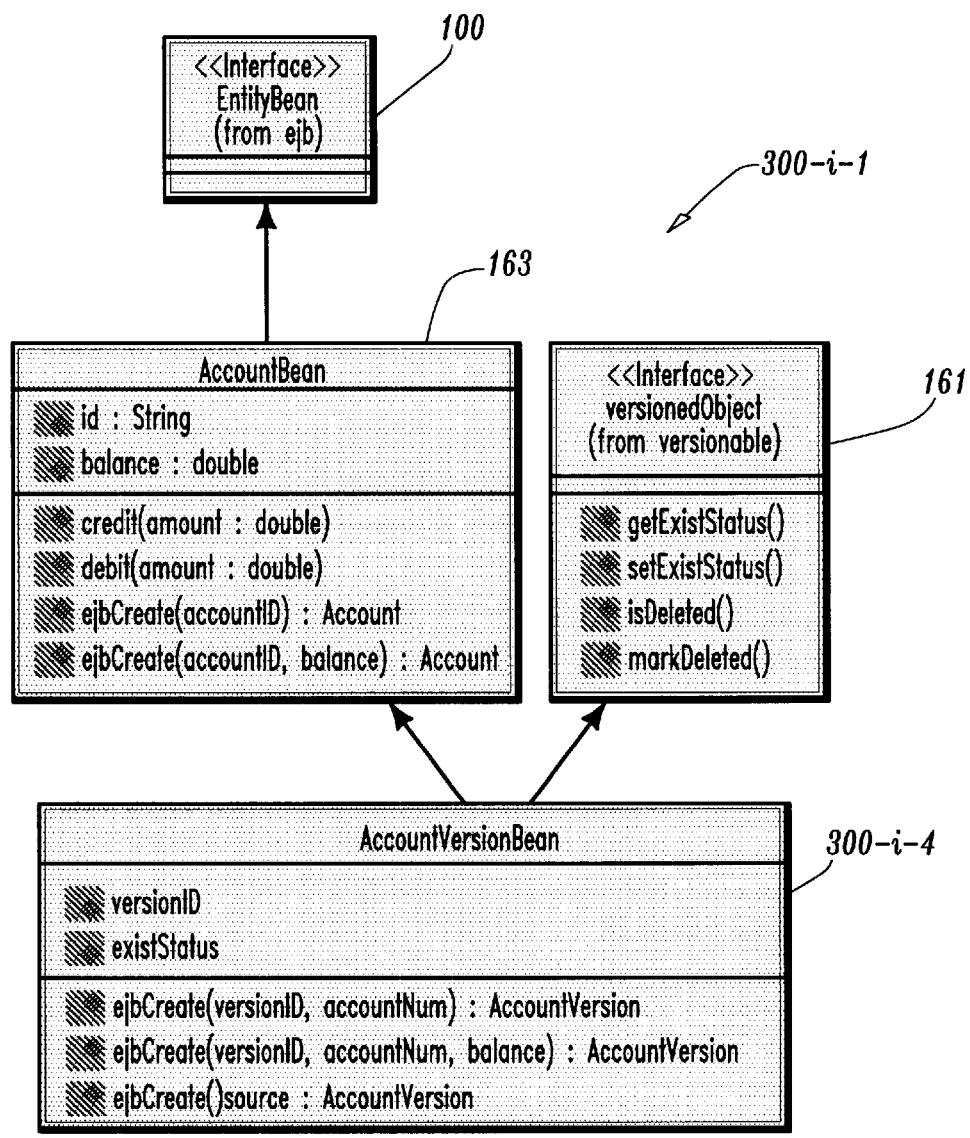
FIG. 8 is a block diagram showing a version implementation class object in accordance with the present invention.

Referring to FIG. 8, the Version entity bean 300 extends the implementation of the original business object by employing a version implementation class 300-i-4. For each business method, the Version object provides an overriding method which simply delegates (for example, via the "Java super mechanism") to the implementation in the original business object.

The Version entity bean 300 implements a versionedObject interface 161. This interface includes methods for getting and setting the existStatus attribute. For each create method on the business object home 100-i-2 (FIG. 1), there is an augmented ejbCreate method in the Version bean implementation. The augmented create methods are of the form ejbCreate(String versionID, . . . ) where " . . . " represents the original signature. As with any ejbCreate method, the Version ejbCreate methods establish the instance's identity, and initialize any state attributes. To achieve this, the Version object first calls super.ejbCreate( . . . ), to initialize the original business object 'slice' of the instance. Then, the attributes introduced by the Version are initialized. An additional create method, of the form ejbCreate (Version parent, Version ID) is used to create a new version from an existing parent version. This create method is used by the runtime during the implicit creation of version objects. This create method is also used to create a new version instance from an existing parent version instance, with the two instances differing only in identity. To accomplish this, the create method does the following:

Sets the primary key attributes, except for versionID, from the parent's primary key;

Sets the versionID attribute from the supplied arguments; and

Initializes the remaining attributes from the parent's state.

This is carried out by calling the __initFrom( ) method on the Version instance (described below). Version beans use an __initFrom method to initialize an instance's persistence state from the persistent state of another. "__initFrom" methods are of the form void __initFrom(VersionInterface parent) where VersionInterface is the Version's remote interface. First, the parent's state is extracted by calling __getState( ) on the parent instance. The __getstate( ) method returns an instance of the VersionState class generated for the given business object (see VersionState class below). Then, each attribute in the version instance is initialized using the corresponding value from the VersionState instance. After all attributes have been initialized, the ejbLoad( ) method is called on the instance, allowing the business object to initialize any derived or cached state.

The __initFrom method, as described above, is generated into the Version EJB. However, in some situations it may be necessary for the business object to provide custom logic for this operation. In such cases, the business object simply provides its own __initFrom method in the implementation class. For example, in a unit of work deployment tool, when the deployment tool detects an "__initFrom" method in the implementation class, the __initFrom method is not generated in the Version implementation class. The __initFrom method has the form void __initFrom(RemoteInterface parent) where RemoteInterface is the Business Object's remote interface.

A VersionState class 400 is used to externalize the persistent state of Version beans. The VersionState class includes public fields for all containers managed in the original business object, excluding the primary key fields.

The Facade Entity Bean

Referring again to FIG. 2, clients do not access business objects directly. Rather, for each business object, a representative Facade 200 is used to coordinate access to Version instances. At runtime, clients invoke methods on a Facade instance, which in turn delegates to the Version object associated with the client's isolation context. The Facade bean's remote interface 200-i-1 extends the remote interface of the original business object 100-i-1. By extending the original business object's remote interface, references to Facade instances can be substituted for references to the original business object.

The Facade bean 200 includes a primary key class 200-i-3 which may use the same primary key class as the original business object.

Through clients invoke methods, such as business methods, on Facade objects, the Facade home 200-i-2 is used only by a framework of the system. Clients create, locate, and remove business objects using a helper Factory object 142 (see FIG. 3). Facades 200 support a create method, which accepts a primary key as its only parameter. The Facade create method is invoked by the Factory object 142 during the instantiation of a new business object. The findByPrimaryKey method returns the Facade instance associated with the given primary key. For each finder method specified in the original business object home, there is an augmented finder method in the Facade home.

The augmented finder methods have the same signature as the original finder method, plus the additional context parameters. These finder methods are "isolation" aware; that is, only versions visible in the given isolation context are considered.

The Facade 200 provides an implementation 200-i-4 for each method on the original business object. This implementation first locates the Version instance associated with the client's isolation context, and then delegates the method call to that Version instance.

Figure 9:
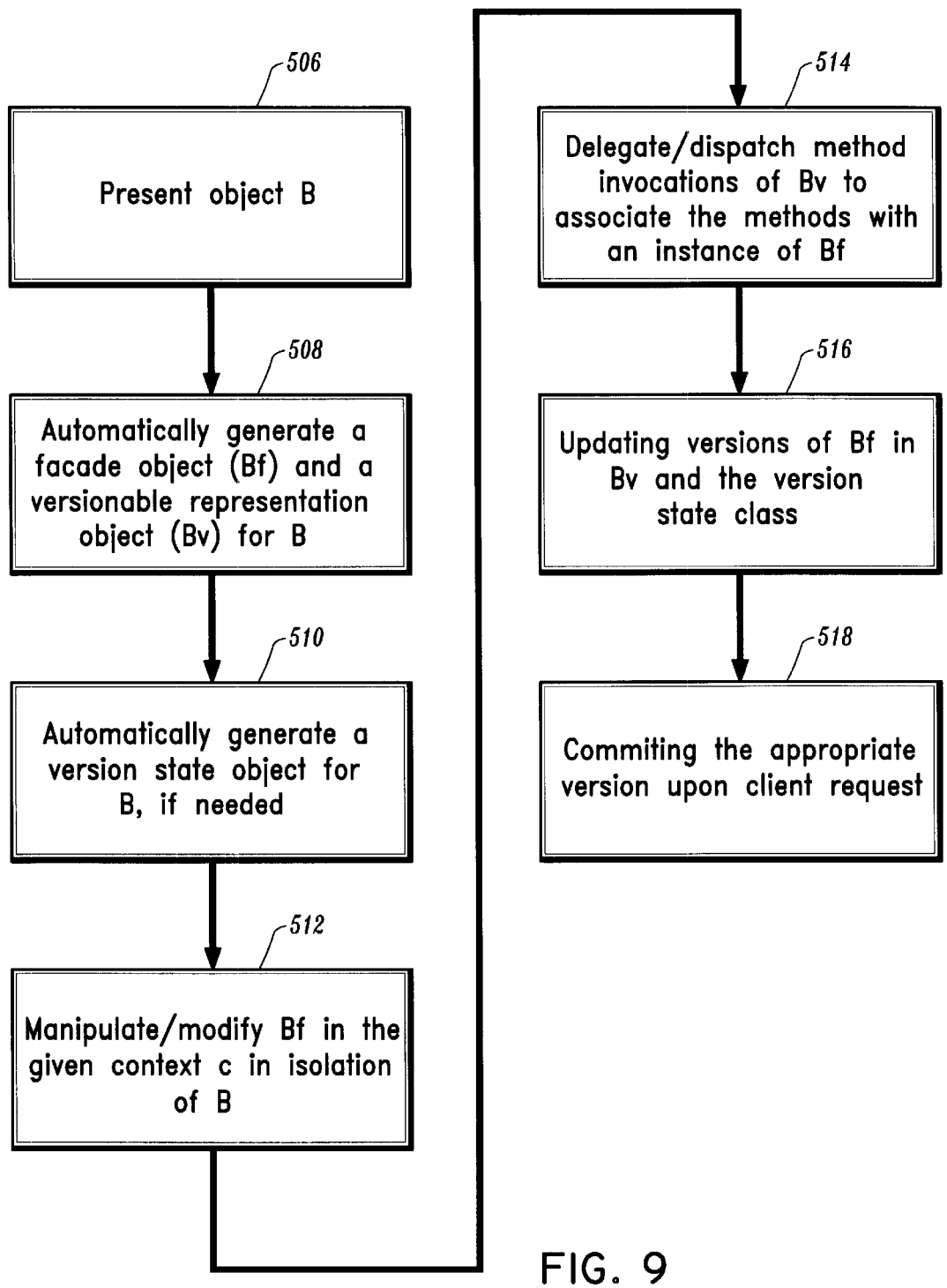
FIG. 9 is a block/flow diagram showing an object isolation system/method in accordance with the present invention.

Referring to FIG. 9, a block/flow diagram for a system/method of the present invention is shown. In block 506, an object B, for example, an entity JAVABEAN, is provided for facilitating interactions between a client or clients and a distributed system. In block 508, the distributed system automatically produces entity EJBs including a facade object, Bf, and a versionable representation object, Bv. In block 510, a version state object is also automatically generated. However, initially a version state may not exist and is generated after a first invocation of a method in Bv.

In block 512, each Bf EJB supports the same interface as B, the original EJB. Clients can manipulate instances of Bf as if the client were manipulating instances of B. At runtime, clients are given references to instances of Bf rather than instances of B. Each client executes within a context, c. Access to an object in a particular client context is written, e.g., as Bf(c). In block 514, any method invocation on Bf(c) is transparently delegated to a Bv instance associated with c, e.g., a version of the object represented in Bv associated with the client or clients or a particular function or utility which calls for permission to manipulate or modify objects in the distributed system.

In block 516, a new instance of Bv is created and associated with c upon a first method invocation. In this way multiple versions are maintained in Bv which are accessible through facade Bf. Object isolation is provided for the application (instead of employing strict locking rules) by applying the versioning processes as described above. In block 518, after the methods invoked by the client through the facade, the client version associated with the context c is committed. State changes done to all objects within the scope of the context become visible to the system and object B. The object provider and the object user are therefore unaware of the generation and manipulation of facade version and version state objects.

Figure 10:
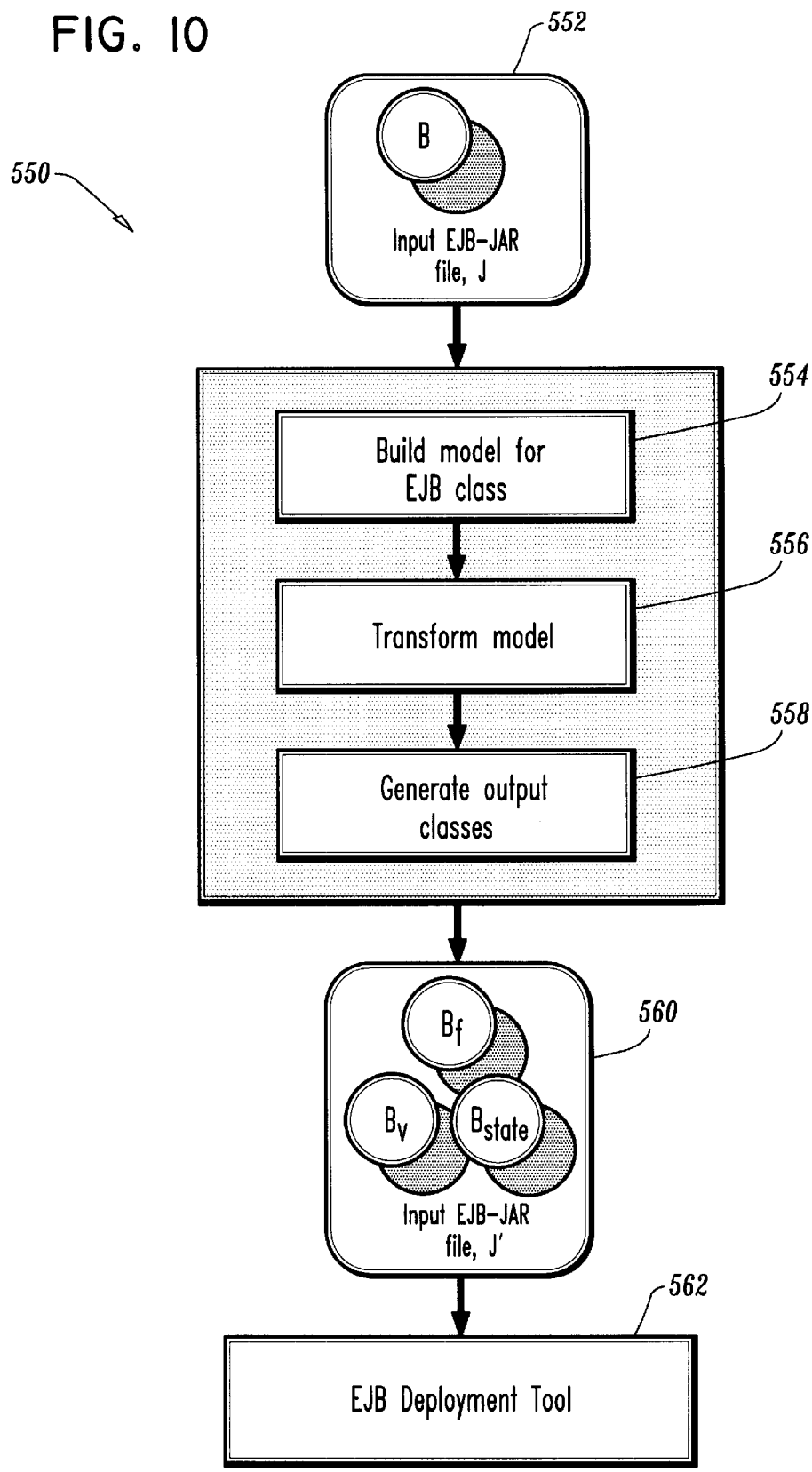
FIG. 10 is a block/flow diagram showing a deployment tool employed in accordance with the present invention.

Referring to FIG. 10, a deployment tool 550 which subsumes a JAVA deployment tool is illustratively described. In this example, deployment tool 550 is employed as a pre-processor for the deployment provided with an EJB server. Given an EJB-JAR file, J, including one or more input classes, B1 . . . Bn, deployment tool 550 produces an output EJB-JAR file, J', including, for each input EJB in J, output EJB classes Bf, Bv and Bstate, where Bf is the facade EJB class, Bv is the version EJB class and Bstate is the version-state class, as described above.

The output EJB-JAR file, J', can then be deployed using the deployment tool provided by the EJB server. Once deployed in the EJB server environment, an object instantiated from an EJB class processed by tool 550 can be manipulated by concurrently executing clients, where each client is associated with a unique version of that object. Neither the provider of the original EJB class need be cognizant of Bf, Bv or Bstate (as provided by the invention). The provider or clients need not be aware of the use of tool 550 during the deployment process (as provided by the invention).

In block 552, deployment tool 550 is invoked given an input EJB-JAR file, J. In block 554, for each EJB class, B, in J, tool 550 builds an internal model, M, representing that EJB class. In block 556, for each model, M, tool 550 generates a new model, M', representing a facade, a version and a version-state class. For each transformed model, M', tool 550 generates the EJB classes implementing that model. In block 558, tool 550 packages all generated classes into an output EJB-JAR file, J'. In block 560, the output EJB-JAR file, J' is then deployed using an EJB server deployment tool provided in block 562.

The present invention may be implemented with an EJB isolation container; however, the present invention is preferably employed at the application level for example on a unit of work (UOW) framework for long-running, nested transactions.

In distributed object systems, applications often need concurrent access to shared objects. There is a competing need that applications manipulate these shared objects in isolation, e.g., changes made by an application are visible to other applications only after a consistent state has been reached. If the application cannot reach a consistent state, these changes should be safely discarded. The period during which an application isolates its changes from other applications is called a unit of work (UOW), or transaction. The distributed object system will support transactions as a core service, permitting applications to easily demarcate transaction boundaries and enforce transactional requirements.

The most common transaction model supported by these systems is the traditional, flat-transaction model. To support transaction isolation, these models employ techniques that are inappropriate for many applications. For example, many use locking to restrict object access to a single application at a time. Though more exotic transaction models have been proposed, none have found practical application in distributed object systems.

The present invention transforms a distributed object into an object that can participate in systems that use versioning to employ more flexible transaction model. Neither the original object (or object provider), nor the application code (or object user) that manipulated the object, need be aware of this transformation. After applying this transformation, the objects can be deployed in a distributed object system, allowing applications to manipulate these objects as though the application were executing alone on the system. That is, the effects of executing applications are isolated from one another. This general purpose solution is well suited for many applications, including nested transactions, what-if scenarios, disconnected computing, object replications, etc.

The unit-of-work (UOW) transaction model for implementing long-running business processes will now be described to illustrate an application where the present invention is particularly useful. The UOW transaction model regards a long-running business process as a directed, acyclic graph, whose nodes are testable transactions, "units-of-work". Each UOW has one parent UOW (except for the root UOW), and may have multiple children UOWs.

UOW are modeled as objects. These UOW objects represent a business process scope within which invocations on the business objects and data objects are made.

The following visibility rules are to be obeyed:
  The state of all objects in the scope of a parent UOW is visible to all children of that parent.
  When a child UOW commits, state changes done to all objects within the scope of the child UOW become visible to the parent UOW.
  State changes performed by a child UOW are not visible to its siblings until the child UOW commits.

A (business or data) object's state, and its visibility, thus change over time as UOWs are created, committed, or rolled back. Objects can become visible and be made persistent as UOWs complete.

To enable this model of nested, UOW-scoped transaction processing, with each of these scopes being potentially long-lived, the UOW transaction model distinguishes two principal transaction phases:
  the first phase, rehearsal, and
  the second phase, performance.

The rehearsal phase is the long-running phase of the transaction, where the transaction is performed on multiple versions of (data) objects. Each object version only exists within the scope of a particular UOW (is associated to a particular UOW object).

All transaction-affecting and state-changing operations on objects (object versions) of this phase are recorded in an operational log. Users accomplish work during the rehearsal phase, and the work can be made persistent (so that if the system crashes, user activity will resume from the last syncpoint). However, no actual work is committed in a transactional sense during this phase.

The purpose of the rehearsal phase is to allow long-running, concurrent activity to occur without locking resources, while, at the same time, a persistent copy of user activity, an operational log, is created. Because each UOW operates on a private set of data (an object version), protection from concurrent activity is automatically provided, making lock constraints unnecessary in accordance with the invention.

The performance phase is the short-running phase following the rehearsal phase. During performance, the operational log of the rehearsal phase is replayed as a two-phase commit transaction (i.e., the actual commit is performed).

The replay is short-running, as the time-consuming activities of the rehearsal phase, such as user think, input, and reply time, business process time, and other activities that add to the long duration (in contrast to method execution time) are omitted. The operational log can be replayed as a traditional transaction, using standard transaction services provided by database systems, or services like the CORBA OTS.

During the rehearsal phase, concurrency is not an issue, as all manipulations are made on UOW-scoped, private object versions. For the performance phase, however, concurrency must be considered, as potential conflicts between sibling UOWs are resolved.

The approach taken by the UOW model is to aim at a maximum of concurrence. This is achieved through specification of predicates (preconditions to methods) to determine whether two transactions (UOWs) conflict. Using predicates, concurrence is increased as opposed to optimistic or timestamp-based locking schemes, as fewer UOWs are unnecessarily rolled back.

For example, in a bank account debit transaction, it is not important that the precise amount of funds in the account at performance time matches the amount of funds at rehearsal time. Under optimistic transaction semantics, a difference in state detected between rehearsal and performance would lead to transaction abortion. Instead of logging account balance values, in the UOW model, a boolean result value of the predicate balance >=x, and a void result value of the transform balance -=x, where x is the amount of money to be withdrawn, would be logged. As long as the predicate is true at performance time, sibling UOWs can invoke the withdraw( ) method and successfully commit to the parent UOW.

An implementation framework supporting the UOW transaction model has been developed by the inventors, allowing a long-running business process to be "UOW-ized" following a distributed object, client/server architecture.

A key design pattern used in the implementation framework is the facade design pattern as described above. Transactional data objects (the versioned objects) are never directly accessed by clients, but interactions only occur through facade objects, which encapsulate a set of versioned objects (of one type), and transparently delegate method invocations to the particular versioned objects that are associated with the UOW.

It is also the facade object's responsibility to transparently create object versions for a given UOW, if no object version already exists for that UOW.

Facade objects, versioned objects, and UOW objects are all provided by the framework. The application-specific information of business transaction logic, and business and data objects ("base objects"), is preferably provided by the application developer.

The business transaction logic, i.e. the sequences of method invocations on objects, is captured in the code of the object (client) that invokes operations within UOW-scopes, and in application objects (AOs). AOs are an additional, special means to specify transaction logic, as they are guaranteed to be replayed during the UOW performance phase. The framework specializes AOs to FAOs (facade AOs), adding pre/post-code to log the method invocations.

Note that the application developer who programs clients and AOs only uses the base object's interface, but is unaware of the UOW-provided facade mechanism. At run-time, all invocations made by clients are, however, made on facade object implementations.

Each UOW object is, as previously described, associated with a set of versioned objects. An application developer needs to separate the base object interface class ("baseIF") from the base object implementation class ("baseImpl"), so that the UOW-framework can automatically generate a facade class as extension to the object interface class ("baseFacade"), and a versionable object class as extension to the object implementation class ("vbase").

For an e-commerce scenario and the UOW transaction model, attention will be focused on the design of a transactional distributed client/server system for this example.

The major problem to be addressed concerns the support for long-lived transactions, while assuring concurrence and efficient resource utilization. The following design describes a multi-tier, distributed object architecture, into which we introduce UOW transactions.

Figure 11:
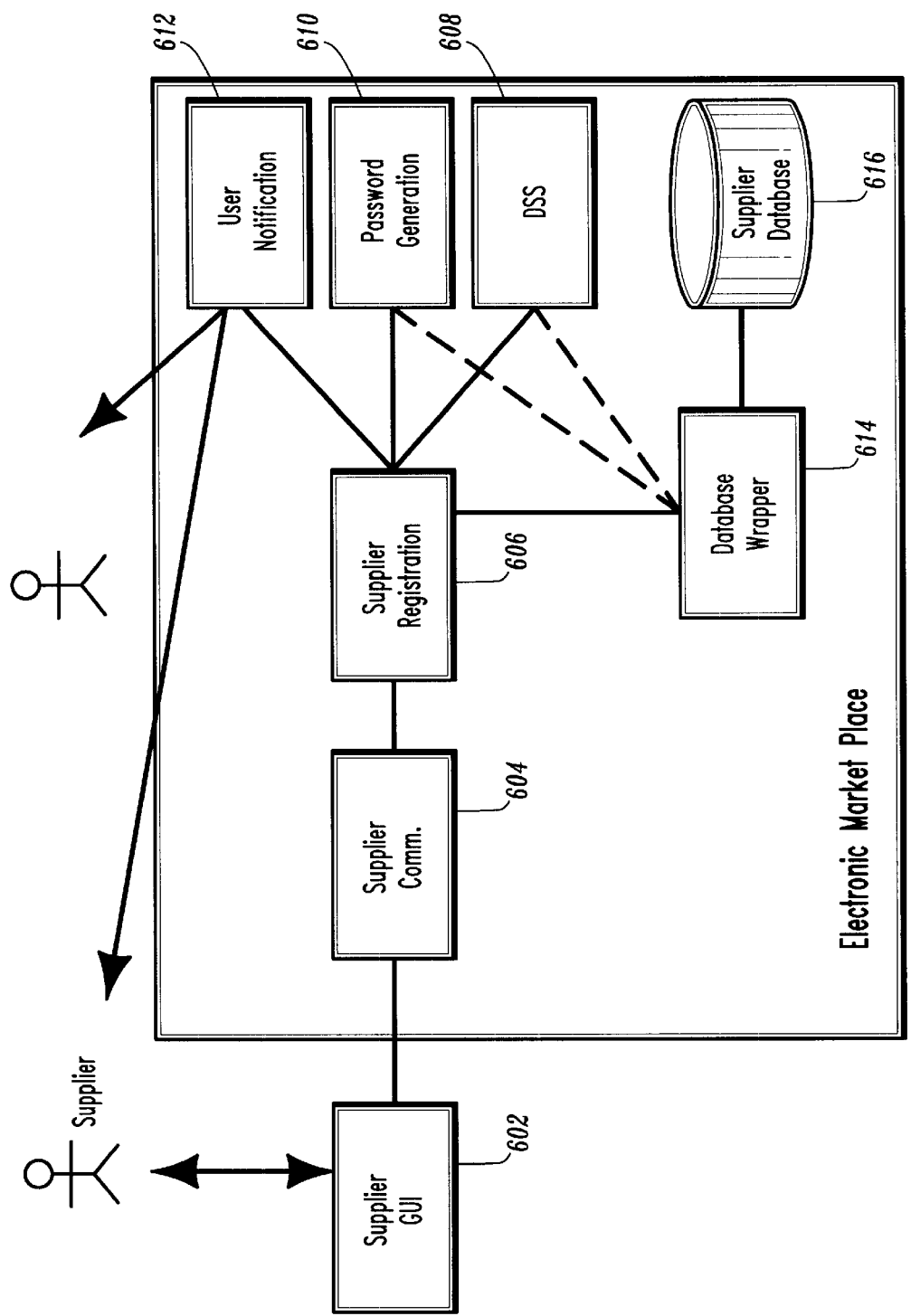
FIG. 11 is a block diagram showing an illustrative system for registering suppliers in an electronic marketplace in accordance with the present invention.

Referring to FIG. 11, in an illustrative system for registering suppliers, system components for the system may include one or more of the following:

a GUI-component 602 for submitting supplier data, a component for client (supplier) communication 604, a component implementing the overall logic for client (supplier) registration 606, a decision-support-system (DSS) to perform verification checks 608, a component for password generation 610, a component for user notification 612, a component providing access to a database (a database wrapper 614), and a database 616 (persistent storage system) of data.

The transactional data in the supplier registration example process is the Supplier data. The components that concurrently modify the data in the course of the transaction are the DSS 608 and the Password_Generation components 610, performing the process steps (sub-transactions) of supplier verification and access authorization. The Supplier data is managed by the Supplier database 616.

In a UOW-transactional version of the system, the Supplier data is modeled as a base object which is versioned and managed by the UOW transaction framework.

The transaction logic for registering suppliers can be fully encapsulated in one of the application servers, as the transaction logic is fixed and determined by the system, not by a system client. (An example of a transaction in an e-commerce scenario that cannot be fully encapsulated in a server would be a negotiation process. In this case, the transaction would be client-controlled.)

Thus, the transaction can be modeled as a server-controlled transaction, i.e. transaction demarcation is part of one of the application servers, for instance the Supplier_Registration component 606. There is no need to expose the transaction logic to the supplier client components.

Concurrency

Three software components modify (or, lead to the modification of) the transactional Supplier data: the Supplier_Registration component, the DSS, and the Password_Generation component. Obviously, no(row-level, page-level, or table-level) locks should be held for a long period of time by any of the software components accessing the Supplier database. Concurrency is an issue between these software components working on behalf of the same transaction, and between different transactions. No component or long-lived transaction should lock out another component or transaction trying to access the same logical date (the Supplier data).

Concurrently activity without locking resources can be achieved with the UOW transaction model, where, in the example, multiple, private Supplier object versions exist for each long-lived (sub-)transaction.

Transaction Span and Distribution

If it is assumed that all components of the system are to be distributed, and that distribution (performance of remote invocations) is costly, the transaction span is to be minimized for the actual two-phase commit database update.

The ability to separate a long-running, concurrent, and (necessarily) distributed transaction work phase from a short-running, less distributed (local) database update phase, therefore, is desirable. The UOW transaction model not only supports, but emphasizes this concept.

Therefore, a long-running UOW transaction phase involving the distributed DSS and the Password_Generation components, can be distinguished from a short-running UOW transaction phase that is performed locally by the Supplier database, or between the Supplier_Registration component and the database, only.

UOW Services and Object Locations

Object version management, and the representation of the business process as a UOW object graph, is the responsibility of the UOW transaction framework.

With one version of the UOW framework, the facade object and its object versions are normally located at the same server that previously, in the non-transactional system, managed the data. However, these objects may be located at different servers as well. In the example, the Database_Wrapper 614 becomes the UOW server offering a Supplier_Facade object and maintaining versioned Supplier objects.

The UOW framework can generate corresponding Supplier version and Supplier facade EJBs from the Supplier EJB. The facade and version EJBs extend and implement UOW-specific interfaces for version and transaction management.

The transaction logic is implemented as part of any EJB component that invokes methods on the Supplier interface (not knowing that it is actually a Supplier facade he or she is dealing with), or, as part of application objects, which are implemented as stateless sessions EJBS.

Prior to invoking methods on the Supplier interface (facade), the UOW context within which the invocation is made is to be established. The client either obtains, or creates a new UOW, and joins the UOW using join( ) on the UOW object. A transaction can be committed or rolled back by invoking the respective method on the UOW object.

The transaction context (UOW context) is implicitly propagated between the distributed EJB components that participate in the transaction, using request interceptors.

Having described preferred embodiments of a system and method for transparent general purpose object isolation for multi-tier distributed object environments (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for manipulating objects in isolation, comprising the steps of:

providing a shared object, B, from an object provider for use on a distributed object system;

producing a new object class including a facade object, Bf, for B and a versionable representation object, Bv, for B wherein Bf supports a same interface as B;

permitting B to be manipulated through the new object class in a given context isolated from other contexts for the object B wherein the steps of producing and permitting are performed such that the object provider and an object user are unaware of the producing and permitting;

delegating method invocations on Bf in the given context to Bv to associate an instance of Bv with the given context such that one or more versions of object B are persistently maintained in the distributed object system; and reconciling object manipulations in Bv with the distributed object system.

2. The method as recited in claim 1, wherein the step of producing includes the step of automatically producing the facade object and the version object upon presentation of the object, B.

3. The method as recited in claim 1, wherein the given context is client specific.

4. The method as recited in claim 1, wherein the given context includes a unique client identifier to identify a version of Bv.

5. The method as recited in claim 1, wherein the step of delegating method invocations on Bf in the given context to Bv includes the step of identifying versions of the object B by comparing attributes of versions of the object Bv.

6. The method as recited in claim 1, wherein the step of delegating method invocations on Bf in the given context to Bv, further comprises the step of maintaining version instances at the facade Bf and transparently dispatching client requests on the object Bv to the version associated with the client.

7. The method as recited in claim 1, wherein the step of producing a new object class includes the step of generating classes for the facade object and the versionable representation object, the classes including a remote interface, a home interface, a primary key and an implementation.

8. The method as recited in claim 1, further comprising the step of producing version state-classes for representing attributes of the object B and copying one version of the attributes to another version of the attributes in accordance with version updates.

9. The method as recited in claim 1, wherein the step of permitting B to be manipulated includes the step of mapping object user requests to versions of the object B in the versionable representation Bv.

10. The method as recited in claim 1, wherein the step of delegating method invocations on Bf in the given context to Bv includes the step of identifying versions of the object B by key attributes of versions of objects.

11. The method as recited in claim 1, wherein the object B includes an ENTERPRISE JAVABEAN.

12. The method as recited in claim 1, wherein the objects Bf and Bv include ENTERPRISE JAVABEANs.

13. The method as recited in claim 1, further comprising the step of storing a plurality of versions of B in Bv on a memory storage device.

14. A program storage device readable by machine, tangibly embodying a program of instructions executable by the machine to perform method steps for manipulating objects in isolation, the method steps comprising:

providing a shared object, B, from an object provider for use on a distributed object system;

producing a new object class including a facade object, Bf, for B and a versionable representation object, Bv, for B wherein Bf supports a same interface as B;

permitting B to be manipulated through the new object class in a given context isolated from other contexts for the object B wherein the steps of producing and permitting are performed such that the object provider and an object user are unaware of the producing and permitting;

delegating method invocations on Bf in the given context to Bv to associate an instance of Bv with the given context such that one or more versions of object B are persistently maintained in the distributed object system; and reconciling object manipulations in Bv with the distributed object system.

15. The program storage device as recited in claim 14, wherein the step of producing includes the step of automatically producing the facade object and the version object upon presentation of the object, B.

16. The program storage device as recited in claim 14, wherein the given context is client specific.

17. The program storage device as recited in claim 14, wherein the given context includes a unique client identifier to identify a version of Bv.

18. The program storage device as recited in claim 14, wherein the step of delegating method invocations on Bf in the given context to Bv includes the step of identifying versions of the object B by comparing attributes of versions of the object Bv.

19. The program storage device as recited in claim 14, wherein the step of delegating method invocations on Bf in the given context to Bv, further comprises the step of maintaining version instances at the facade Bf and transparently dispatching client requests on the object Bv to the version associated with the client.

20. The program storage device as recited in claim 14, wherein the step of producing a new object class includes the step of generating classes for the facade object and the versionable representation object, the classes including a remote interface, a home interface, a primary key and an implementation.

21. The program storage device as recited in claim 14, further comprising the step of producing version state-classes for representing attributes of the object B and copying one version of the attributes to another version of the attributes in accordance with version updates.

22. The program storage device as recited in claim 14, wherein the step of permitting B to be manipulated includes the step of mapping object user requests to versions of the object B in the versionable representation Bv.

23. The program storage device as recited in claim 14, wherein the step of delegating method invocations on Bf in the given context to Bv includes the step of identifying versions of the object B by key attributes of versions of objects.

24. The program storage device as recited in claim 14, wherein the object B includes an ENTERPRISE JAVABEAN.

25. The program storage device as recited in claim 14, wherein the objects Bf and Bv include ENTERPRISE JAVABEANs.

26. The program storage device as recited in claim 14, further comprising the step of storing a plurality of versions of B in Bv on a memory storage device.

27. A method for manipulating objects in isolation comprising the steps of:
transforming an object class, B, into a new object class, B', which subsumes B, such that instances of B' are substituted for instances of B, where B' provides behavior permitting a same instance of B' to be used concurrently by multiple object users, such that each object user can manipulate a state of the object instance isolated from effects of other object users and an object provider and an object user are unaware of the transformation to the new object class;
the step of transforming further comprises the steps of:
providing an object class, B, from an object provider for use on a distributed object system;
for the new object class:
producing a version class, Bv, where Bv supports the behavior and attributes of B; and
producing a facade class, Bf, where Bf supports a same interface as B, wherein instances of Bf are substituted for instances of B such that invocations on an instance of Bf are delegated to an instance of Bv which is associated with an object user.

28. The method as recited in claim 27, wherein the step of transforming is performed automatically upon presentation of the object class, B.

29. The method as recited in claim 27, further comprising the step of maintaining version instances at the facade class, Bf, and transparently dispatching client requests on the object Bv to a version associated with the client.

30. The method as recited in claim 27, wherein the step of producing a facade class includes the step of generating classes for the facade class, the classes including a remote interface, a home interface, a primary key and an implementation.

31. The method as recited in claim 27, wherein the step of producing a version class includes the step of generating classes for the version class, the classes including a remote interface, a home interface, a primary key and an implementation.

32. The method as recited in claim 27, further comprising the step of producing version state-classes for representing attributes of the object class B and copying one version of the attributes to another version of the attributes in accordance with version updates.

33. The method as recited in claim 27, further comprising the step of storing a plurality of versions of B in Bv on a memory storage device.

34. The method as recited in claim 27, further comprising the step of reconciling object manipulations in Bv with the distributed object system.

35. A program storage device readable by machine, tangibly embodying a program of instructions executable by the machine to perform method steps for manipulating objects in isolation such that an object provider and an object user are unaware of the manipulation, for performing the method as recited in claim 27.

* * * * *